(12) United States Patent
Doeberl et al.

(10) Patent No.: US 6,237,033 B1
(45) Date of Patent: May 22, 2001

(54) SYSTEM FOR MANAGING USER-CHARACTERIZING NETWORK PROTOCOL HEADERS

(75) Inventors: Terrence M. Doeberl, West Redding; Ronald P. Sansone, Weston; Suti Prakash, Stamford; Paul W Porter, Southbury; Marcy F. Macdonald, Shelton; Judith A. Martin, Stamford; Ronald Reichman, Trumbull, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/231,358

(22) Filed: Jan. 13, 1999

(51) Int. Cl.$^7$ .................................................. G06F 13/00
(52) U.S. Cl. ........................................... 709/223; 707/532
(58) Field of Search .............................. 709/223; 707/532

(56) References Cited

U.S. PATENT DOCUMENTS

| | | | |
|---|---|---|---|
| 5,684,954 | * 11/1997 | Kaiserswerth et al. | 709/236 |
| 6,085,224 | * 7/2000 | Wagner | 709/203 |
| 6,085,230 | * 7/2000 | Ryuutou et al. | 709/203 |
| 6,134,592 | * 10/2000 | Montulli et al. | 709/229 |

\* cited by examiner

Primary Examiner—Kenneth R. Coulter
(74) Attorney, Agent, or Firm—Ronald Reichman; Michael E. Melton

(57) ABSTRACT

A system for enabling a user of a computer attached to a computer network, and accessing sites on the network, to manage user-characterizing protocol headers on the user's computer. A particular application of the present invention is to manage so-called Internet cookies on a computer attached to the Internet and using a browser to access websites through the World Wide Web. Such cookies have a type and a value. The managing includes displaying to a user an interpretation of cookies that have been set on the user's computer; the interpretation is made by an interpreter referring to a local cookie dictionary, on the user's computer, having entries corresponding to different types of cookies. In various alternative embodiments, the managing also includes changing the values set by the websites, and fabricating cookies of types not necessarily used by a website in order to express to the website preferences a user wants the website to know. In some embodiments, the system also includes a means by which the fabricated cookies are made knowable to websites on the Internet, namely a universal cookie dictionary; and a site-specific cookie dictionary maintained by a third party so as to contain updated entries for interpreting cookies used by websites on the Internet. In one aspect of the invention, a user can periodically update the local cookie, using a local cookie dictionary, to include changes to the site-specific and universal cookie dictionaries.

14 Claims, 4 Drawing Sheets

SYSTEM FOR MANAGING USER-CHARACTERIZING NETWORK PROTOCOL HEADERS

FIELD OF THE PRESENT INVENTION

The present invention pertains to user-characterizing network protocol headers, such as so-called Internet "cookies," which are used by Internet content providers for various reasons, but in particular for providing information about a user to a website operated by the Internet content provider. More particularly, the present invention pertains to a system for managing such protocol headers, enabling a user to interpret and, preferably, adjust the content of the protocol headers.

BACKGROUND OF THE INVENTION

An Internet cookie is a protocol header consisting of a string of characters (cookie content) that is inserted by a web server, operated by an Internet Content Provider (ICP), into the random access memory (RAM) on a user's computer (client) while the user is operating a browser (application program) to access web pages on the Internet, typically through an Internet Service Provider (ISP) using the World Wide Web (type of network operating system). An ICP may also be an ISP, as in the case of, for example, American On Line.

A web server may "set" a cookie at various points during a user's access of the web server. The string of characters or content comprising a cookie specifies a domain, path, lifetime and value of a variable. The variable may be, for example, the number of times the user has visited the web server or particular web pages provided by the web server, and the domain and path indicate a website (a group of similar web pages operated by a single entity). If the lifetime of the cookie is greater than the time the user spends at the website, then the cookie may be saved in a cookie file (file of cookies) for future reference by either the user, the web server setting the cookie or other web servers.

Cookies are set for many different reasons, including enabling a web server or an ICP to customize the information it provides to a user, to facilitate on-line sales or services (e.g., implementing a so-called "shopping basket"), for tracking web pages the user has visited, or for providing the web server or ICP's website with some demographic information (presumably only geographical information or at what time a user tends to visit the ICT's website).

The idea behind the use of protocol headers such as cookies is to enable a web server or ICP to gather information about a user. By setting one or more long-lived cookies in a user's cookie file, the next time the user accesses the website, the ICP can know certain information about the user that will, in theory, facilitate the user's productive use of the information accessible at the ICP's website. This works because when an ISP directs a user to a website, the browser on the user's computer examines its cookie file for cookies that have been set by the website and provides those cookies to the website by way of introducing itself (representing the user) to the website. The website may then, or sometime later, set new cookies on the users computer, or alter the value of cookies previously set there.

Cookies are also used to securely store personal data a user has shared with a website. As mentioned above, cookies et by an ICP in the RAM of a user's computer end up stored in a file on the user's hard drive if the lifetime of cookie is longer than the time the user spends at the ICP's website. All such cookies are stored in a single file on the user's hard drive (a file usually called "cookies.txt").

More browsers today, including Netscape and Microsoft Internet Explorer, can be configured to display to a user a warning that a cookie is about to be set, and to give the user the option of blocking the cookie. The user is often even able to view the content of the cookies. However, the user often has no knowledge of the meaning of the content of the cookie nor the intended use for the cookie contents by the ICP. In some cases, when a user blocks an ICP from setting a cookie, the ICP's website refuses to allow access to the website by the user. Since there are many innocuous and quite useful reasons for a website to set a cookie, it is probably not, as a general rule, in the user's best interest to simply block all cookies.

In addition to configurable software for disabling a website from setting a cookie in the first place, the prior art includes a number of applications intended to assist a user in removing the file of long-lived cookies (the cookie file). Both the cookie-blocking browsers and cookie file managers indicate to a user the identity of the website responsible for each cookie intended to be set or stored in the cookie file. Identifying the website that set a cookie is easy because, as indicated above, each cookie includes, as text, the path and domain for the website that set the cookie. The prior art also includes software that will enable a user to remove sensitive information from the user's browser cache and cookie files.

What the prior art does not provide is a means by which a user can, using the same mechanism for exchanging information about who the user is, convey to a website preferences the user may wish to convey, instead of only preferences the website has deemed useful to know. For example, a user may wish to communicate to a website that the user would prefer to receive any advertising, demonstration material or other kinds of literature as postal mail or through a courier service.

What stands in the way of communicating such preferences is that the ICP website that set a cookie sometimes does not have variables (type of cookie) that are appropriate for what the user wants to express. What is needed is a means by which a user can not only identify and delete a cookie file or delete particular cookies within a cookie file or still in RAM, only guessing what the cookies content conveys, but a means of actually interpreting the content of the cookies within a cookie file or still in RAM, and also a means by which a user can create new types of cookies (cookies with new variables) that may be offered to a website of an ICP.

SUMMARY OF THE INVENTION

Accordingly, the present invention has as an object interpreting for a computer user the content of a user-characterizing protocol header, such as an Internet cookie, and, optionally, adjusting its content.

It is another object of the present invention to enable such a user to fabricate a user-characterizing protocol header having content of the user's own creation, and thereby convey to a website information the user wants to convey.

Correspondingly, it is a still further, optional object of the present invention to provide a means by which a website receiving from a user a protocol header fabricated by the user can interpret the protocol header if its interpretation is not apparent from inspection.

To achieve these objects, the present invention interfaces with a string of characters defining a protocol header on a user's computer to provide a user with an interpretation of at least a portion of the string of characters, the invention comprising: a dictionary containing at least one entry, the entry comprising a first string of characters representing at least a portion of the protocol header and a second string of characters representing a meaning associated with the first string of characters; an interpreter for retrieving the second string of characters based upon the first string of characters; and an editor, for displaying the second string of characters retrieved by the interpreter.

BRIEF DESCRIPTION OF THE DRAWINGS

The novel features believed characteristic of the invention are set forth in the appended claims. The invention itself, however, as well as other features and advantages thereof, will be best understood by reference to the detailed description when read in conjunction with the accompanying drawings, of which:

DETAILED DESCRIPTION

Figure 1:
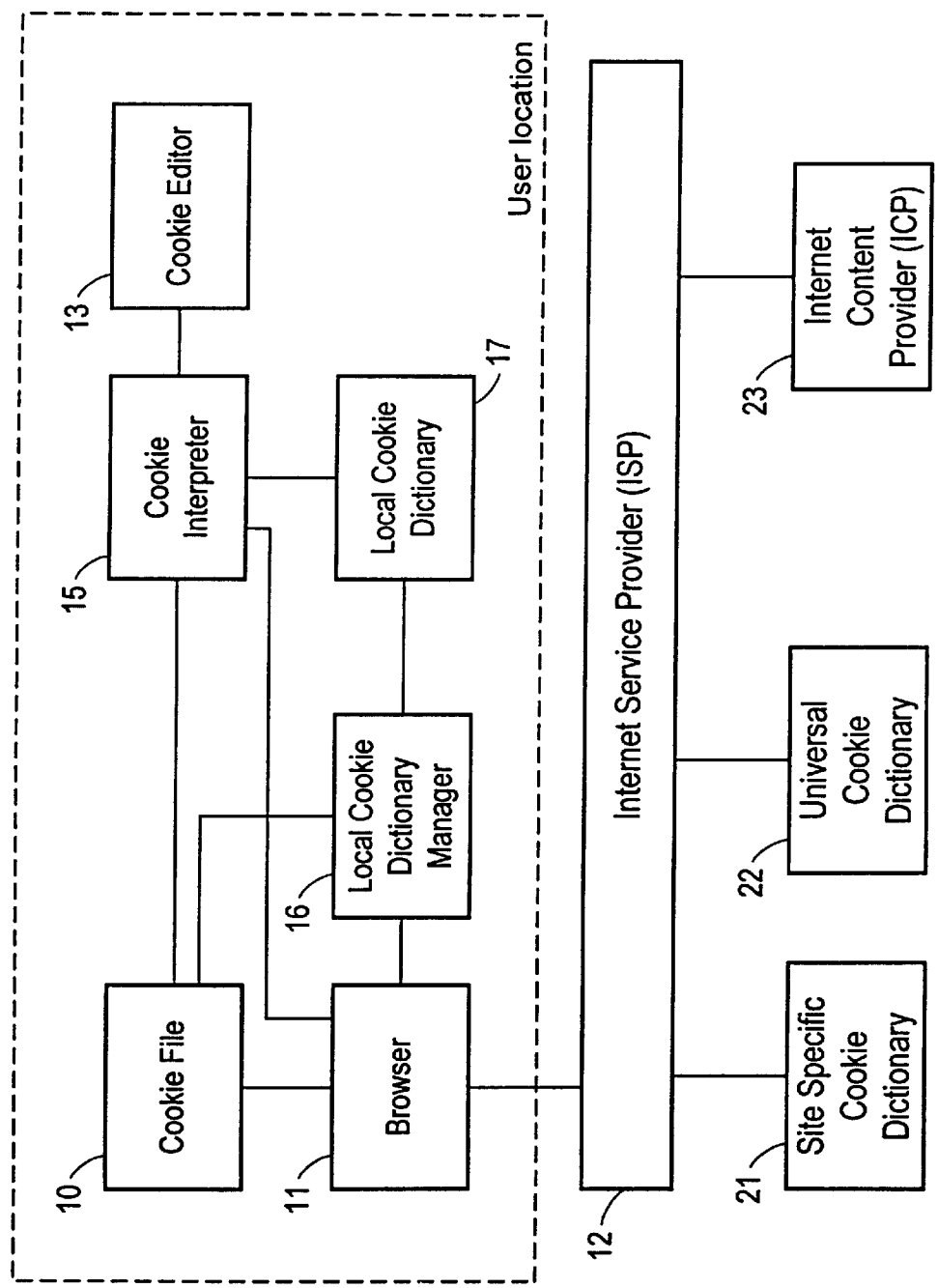
FIG. 1 is a block diagram of a system for managing an Internet cookie according to the present invention.

The present invention is hereinafter described in a particular context of the Internet, namely where a user operates a computer attached to the Internet, and accesses websites of Internet content providers through the World Wide Web, using a browser, which, as part of the World Wide Web protocol, allows websites to set on the user's computer so-called Internet cookies, which are a kind of user-characterizing protocol header. The present invention, however, need not find application only on the Internet, or only in the World Wide Web environment of the Internet. Instead of the Internet, the present invention can be used on any network in which there is, as a protocol between sites of the network, the setting of user-characterizing protocol headers by a computer at one site onto the computer at another site. Thus, the network can be different than the Internet, the network operating system can be different than the World Wide Web, the site interfacing software for interfacing with a server at a site of the network can be different than the browsers of the World Wide Web, and the protocol headers exchanged between sites can be different than cookies, but are still a user-characterizing protocol header in the sense that an Internet cookie characterizes a user for a website.

The cookies that are managed by the present invention can be on the user's computer; they may reside in random access memory (RAM), or in non-volatile storage, such as the user's hard drive.

The preferred embodiment of the present invention includes a data dictionary, on the user's computer, that serves as a basis by which the present invention interprets cookies on the user's computer. This data dictionary is here called a local cookie dictionary, and its entries are types of cookies, or, equivalently, cookie variable types. The local cookie dictionary is the dictionary routinely used, in the preferred embodiment, to interpret cookies. It is the data dictionary first referred to. Any data dictionary used as such a principal reference, is here called a principal dictionary. Such a data dictionary need not be on the users computer. Instead, it may be remote.

For each entry in the local cookie dictionary, i.e., for each type of cookie, the local cookie dictionary provides content data indicating an interpretation of any particular cookie of that type, including an explanation of the cookie type, i.e., the cookie variable, and information about the possible values that can be assigned to the cookie. The interpretation for each entry is sufficient for building a template out of which a cookie can be fabricated; to enable building such a template, content data for an entry includes an indication of how to parse any associated cookie. For some Internet cookies, those that rely on a tab to delimit the fields of a cookie, the parsing information simply indicates the use of tab-delimited fields.

The invention further provides a cookie editor that enables the user to manage the cookies on the user's computer. The cookie editor does not, however, access the cookies directly; instead the editor interfaces with a cookie interpreter that interprets each cookie, based on the local cookie dictionary. The interpreter not only provides an interpretation of cookies, but also provides information, as part of the interpretation, of the possible values of the cookie. In the basic invention, the cookie interpreter merely provides to the cookie editor an interpretation of a cookie, which the editor then displays. For example, the editor displays a cookie in a way that explains each textual character or logically related set of textual characters making up the cookie. In the preferred embodiment, the user never even views a cookie in its native format, i.e., in the format in which it would appear if it were accessed using a generic text editor.

In optional enhancements of the basic invention, the cookie editor enables the user to alter the values of cookies.

In a further optional enhancement, the interpreter lets the user, through commands to the editor, scroll through the local cookie dictionary and view cookie types the user might want to use to express to a website preferences the user might have, such as preferences the user might have related to how the website sends the user advertising. For example, the user might want to express to a website that the user would prefer that any advertising the website owner might send to the user be sent by postal mail. In that case, the user would select from the local cookie dictionary a cookie for expressing how the user would like to receive advertising, and would indicate, as a value for this cookie, postal mail. The user would also indicate to the editor the website that is to receive the cookie so that the editor can make the cookie into one for that website. How the website would interpret the cookie is addressed in further refinements of the basic invention, but if the cookie is intentionally made to be clear in what it is communicating, the cookie could be interpreted by the recipient without any sort of dictionary.

As explained above, the interpreter stands between the user, acting through the editor, and the cookie. The interpreter ensures the integrity of the cookie by preventing the user from fabricating a cookie or altering a cookie so as to produce a cookie not according to proper format.

As an optional enhancement, to provide for sharing of information about the types of cookies set by different websites, and also the types of cookies the user might want to fabricate, the invention makes accessible over the Internet both a site-specific cookie dictionary providing an interpretation of the different variables used by different websites and identifying which websites uses which variables, and also a universal cookie dictionary providing an interpretation of cookie types for expressing a preference to a website.

Referring now to FIG. 1, a system for managing Internet cookies, either in a cookie file 10 or RAM (not shown), is shown, in the preferred embodiment, to include a cookie interpreter 15, which uses entries (cookie types) and corresponding cookie interpretations in a local cookie dictionary 17, managed by a local cookie dictionary manager 16, to provide a user, through a cookie editor 13, interpretations of cookies. The cookie file 10 is read from and written to, from time to time, by a browser 11 operated by the user. With the browser, the user accesses, through an Internet service provider (ISP) 12, different cookie-setting websites of different Internet content provider 23 (ICPs). In the preferred embodiment, the invention also includes a site-specific cookie dictionary 21 located at a website accessible over the Internet, as well as a universal cookie dictionary 22, located at a website accessible via the Internet.

The first time this invention is used, it provides the user with typical personal information and cookie content on which the user might want to base general preferences for information that might be conveyed by a cookie. The user may set these general preferences to allow, block, or modify a particular item of this personal information or cookie content. For instance, the user may not want to include certain personal information that may have been obtained from sources other than directly from the user; such personal information might include income, age, hobbies, etc.

The present invention is used by a user in two ways: for managing cookies in the user's cookie file 10, or for managing cookies in RAM. In the first way, while the user is either connected to the Internet or offline, the user activates the cookie editor 13 in file mode (as compared with RAM mode, as explained below). The cookie editor then presents to the user an interpreted display of each cookie in the cookie file 10, the interpretation provided through the cookie interpreter 15, using the local cookie dictionary 17 stored on the user's computer. The local cookie dictionary 17 includes at least a subset of the site-specific dictionary entries, and, in the preferred embodiment, all of the (probably much smaller) universal cookie dictionary entries.

Thereafter, for effective use of the present invention, every time browser 11 is activated by the user prior to customizing a cookie file, the user will access the universal cookie dictionary 22 and the site-specific cookie dictionary 21 over the Internet, using the local cookie dictionary manager 16. In the preferred embodiment, the cookie dictionary manager will examine the cookie file 10 on the user's computer and extract from the site-specific cookie dictionary 21 the dictionary items needed by the cookie interpreter 15 to interpret the cookies in the user's cookie file 10, and will also extract from the universal cookie dictionary all of the dictionary items, so that the user has available all possible cookie types for communicating preferences to a website.

According to the standard for a cookie presently proposed by the Internet Engineering Task Force (proposed standard RFC 2109), the content of a cookie includes six parameters:

the name of the cookie (i.e., the type of cookie);

the value of the cookie;

expiration date of the cookie;

path the cookie is valid for;

domain the cookie is valid for; and whether there is a need for a secure connection to use the cookie.

The name and value of a cookie are mandatory content, and the other four parameters can be set manually or automatically. The name (of the cookie/cookie variable) and value (of the cookie/cookie variable) are the essential content of the two cookie dictionaries 21 and 22. For example, in the universal cookie dictionary 22, in the preferred embodiment, there is at least a name and possible values that would allow a user to specify that the user wishes to have all advertising or product literature provided by, for example, first class U.S. mail; thus, the universal cookie dictionary 22 might include here a name "mail-preference," and might include as possible values: U.S. mail, different couriers, and perhaps e-mail.

From this example, it would seem that the use of a cookie dictionary to enable the cookie interpreter 15 to pass to the cookie editor 13 an interpretation of a cookie is not always necessary. Indeed; some of the names (types of cookies) are probably suggestive enough to reveal unambiguously the content of a cookie. However, in many cases a cookie will have a name that is intentionally vague so that only the website that set the cookie will know the content. Thus, for example, one bookstore company on the Internet would have a cookie with content that is difficult for competing bookstores to decipher. For this reason, in general, the local cookie dictionary 17 is needed.

There is, of course, no motivation for obscuring the meaning of the variables in the universal cookie dictionary; thus these variables would be named as suggestively as possible. In fact, in another aspect of the present invention, there is no universal cookie dictionary. Instead, the cookie editor 13 enables a user to create ad hoc variable names and corresponding values. It is then envisioned that website operators will discover that cookies are being conveyed back to their websites with variables not of their own devising. In that case, the website operator can account for these new variables manually, or, when a website operator discovers that a cookie has been returned with a new variable, the website can be configured to automatically access the universal cookie dictionary 22 through the Internet to interpret a cookie created by a user.

In the preferred embodiment, the cookie dictionaries 21 and 22 are maintained by a third party. Users can communicate with the third party any suggestions they have for new variables (types of cookies) and their corresponding range of values by visiting the website of the third party or otherwise communicating their suggestions to the third party. In another aspect of the present invention, users maintain a universal cookie dictionary on their computers, and each website comes to learn that when encountering a cookie created by a user, the website should refer to the user's private universal cookie dictionary to unambiguously interpret the cookie.

In the second way of using the present invention, the user manages a cookie in RAM. In this case, when a website sets a cookie in RAM, the browser notifies the cookie interpreter and passes to the it the RAM address of the cookie. The cookie interpreter executes the cookie editor; the editor then automatically executes in RAM mode (compared to file mode, noted above), i.e., without any involvement by the user. Then the cookie editor attempts to interpret the cookie based on the local cookie dictionary. If it cannot, it directs the browser 11 to access the site-specific cookie dictionary 21, and then searches that dictionary for an interpretation of the cookie. If it locates the interpretation for the cookie, it provides the interpretation to the cookie editor, which in turn displays the interpretation to the user. The user can then inspect the cookie, alter it, or block it.

Another way of managing cookies in RAM is for a user to fabricate a cookie while accessing a website using the browser 11. The user would do this to convey to the website preferences the user may want the website to know. In this scenario, the user executes the cookie editor 13 in RAM mode, as compared with file mode used to manage cookies in the cookie file, and then fabricates a cookie in the same way as when the cookie editor is executed in offline mode. When the user is done fabricating the cookie, the cookie editor sets the cookie in RAM without any further involvement by the user.

Figure 2:
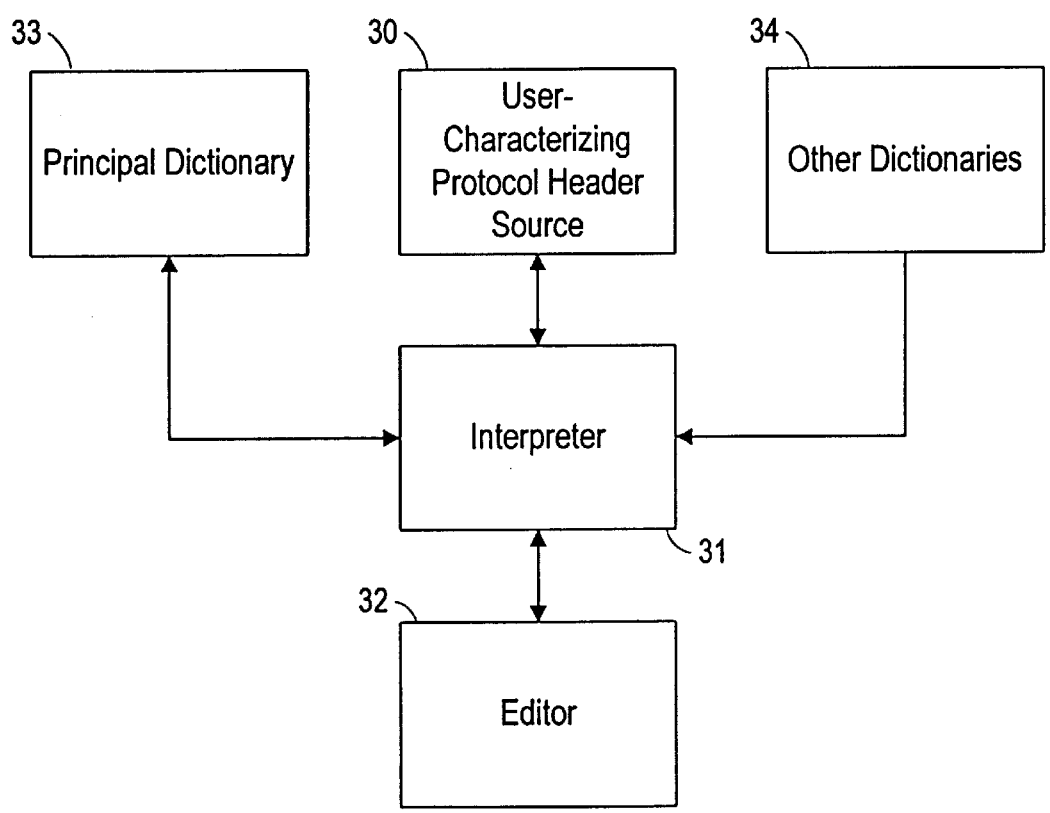
FIG. 2 is a block diagram of a system for managing a user-characterizing protocol header according to the present invention.

Referring now to FIG. 2, a system for managing a user-characterizing protocol header in a general context, not necessarily the Internet, is shown. Here, a user (not shown) invokes an editor 32 in order to manage a user-characterizing protocol header (not shown) from a user-characterizing protocol header source 30. The editor 32 automatically invokes an interpreter 31, which examines the protocol header and searches the local dictionary 33, or, alternatively, searches remote dictionaries 34 residing on a computer other than the user's. In the preferred embodiment, the interpreter 31 would consult the remote dictionaries 34 only if it fails to find, in the principal dictionary, an entry corresponding to the protocol header.

The interpreter 31 prevents the user from interfacing directly with a protocol header. Ordinarily, an embodiment of the present invention would have the interpreter 31 even prevent the user from ever directly viewing a protocol header, i.e., viewing it in its native format, as a pure character string; although in some applications it may be useful for the user to see what a protocol header "really" looks like, and an embodiment in which the interpreter can, optionally, provide such a view is intended to be within the scope of the present invention.

In the usual embodiment, though, the interpreter 31 passes to the editor only the content information in one or another dictionary sufficient for the editor to display the protocol header in a way that makes evident the meaning of each logically related subset of characters of the character string composing the protocol header. The editor 32 then displays this information, and in the preferred embodiment does so by providing on the screen a name for each logically related subset of characters that is at least suggestive to the user of the meaning of the characters. If the user wants, the user can prompt the editor to provide additional interpretation of any particular subset of characters, or, preferably, the editor would do so whenever the user places the pointer from a pointing device on the field and rests it there for more than a brief interval. The editor 32 receives this additional interpretation, as well as all the other content information for the protocol header, from the interpreter 31, and usually all at once, although in some embodiments it is preferable to provide content information only as needed.

Figure 3:
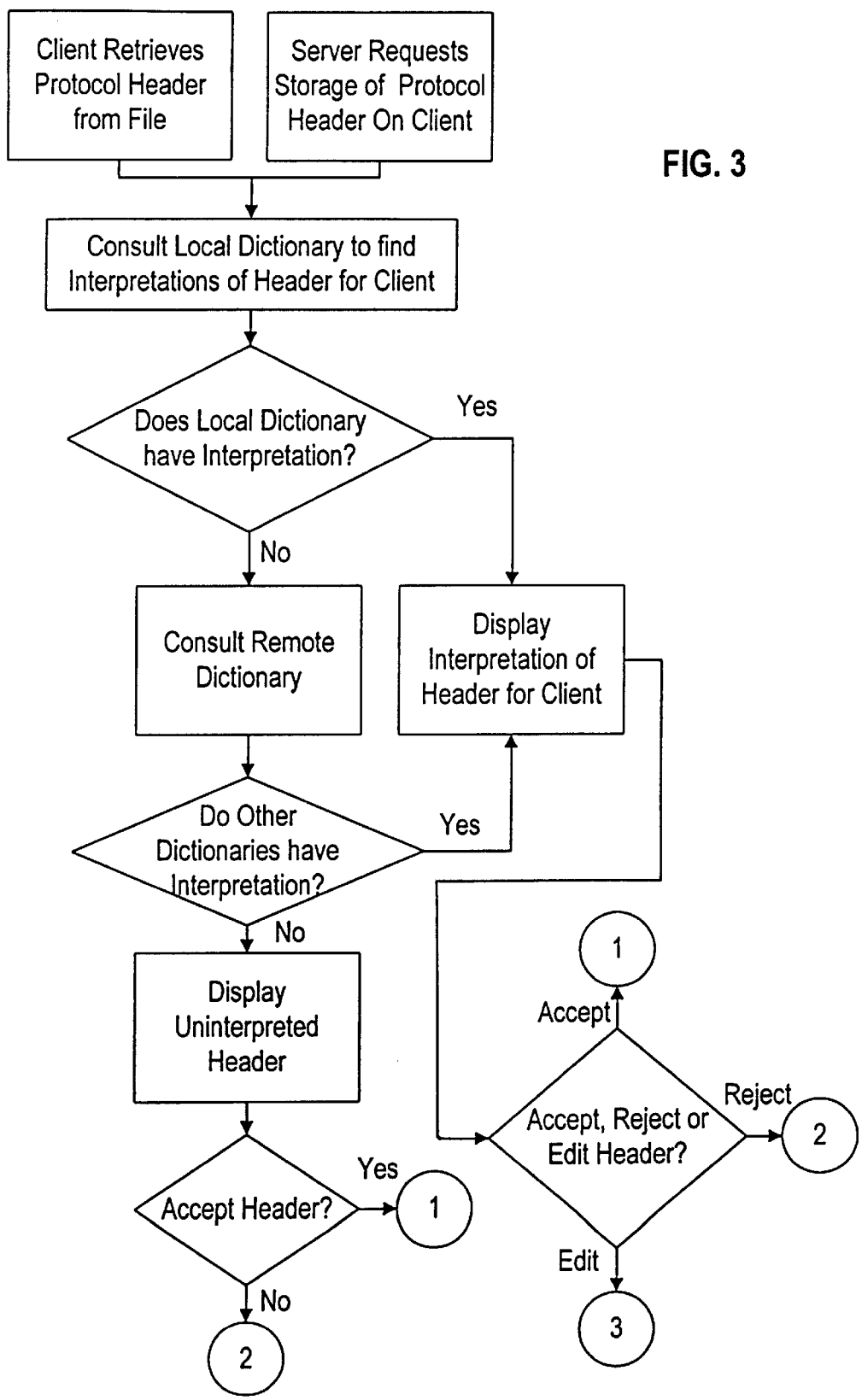
FIG. 3 and FIG. 4 in combination are a flow chart for managing a user-characterizing protocol header according to the present invention.
Figure 4:
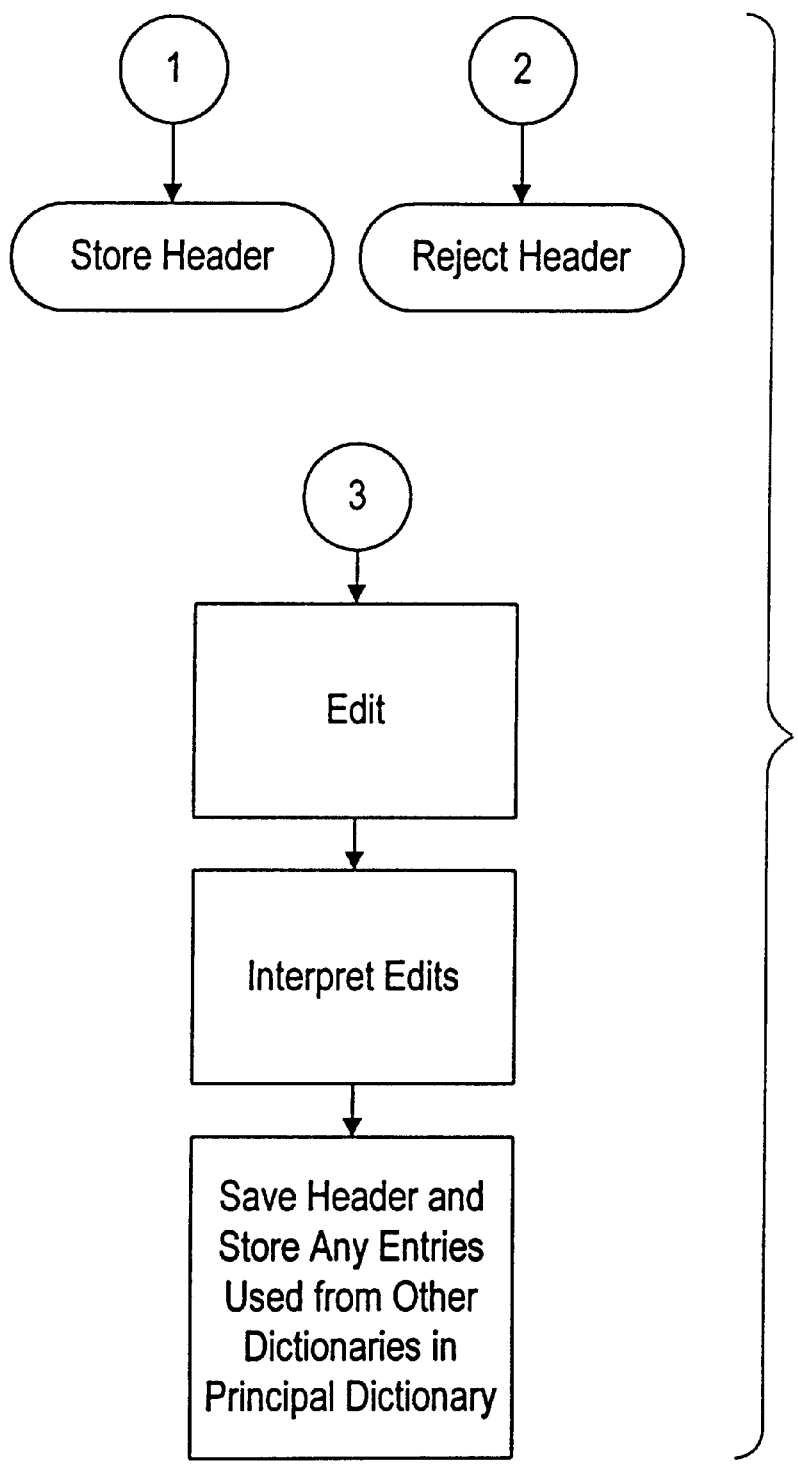

Referring now to FIG. 3 and FIG. 4, which in combination indicate various possible sequences of steps in the operation of the present invention, as shown in FIG. 2.

More generally, the present invention in essence interfaces with a string of characters defining a protocol header on a user's computer to provide a user with an interpretation of at least a portion of the string of characters, the invention comprising: a dictionary containing at least one entry, the entry comprising a first string of characters representing at least a portion of the protocol header and a second string of characters representing a meaning associated with the first string of characters; an interpreter for retrieving the second string of characters based upon the first string of characters; and an editor, for displaying the second string of characters retrieved by the interpreter. The first string of characters is often the character string that defines the type of the protocol header, but need not be. In the Internet context, a website might not use a type (name of a cookie). Instead, it might encode within the value of the cookie both a type and its value. This would be done, for example, to make its cookies more resistant to attempts by others to decipher them. In this scenario, the interpreter, in examining the cookie, would find in referring to a dictionary (principal or other) that the website employs such a scheme and would extract from the dictionary content data indicating an interpretation of the cookie without relying on the type of cookie, just its value.

Although a preferred embodiment of the invention has been specifically described, it will be understood that the invention is to be limited only by the appended claims, since variations and modifications of the preferred embodiment will become apparent to a person skilled in the art upon reference to the description of the invention herein. Therefore, it is contemplated that the appended claims will cover any such modification or embodiments that fall within the true scope of the invention.

What is claimed is:

1. A system for interfacing with a string of characters defining a protocol header on a user's computer to provide a user with an interpretation of at least a portion of the string of characters, the system comprising:
   a dictionary containing at least one entry, the entry comprising a first string of characters representing at least a portion of the protocol header and a second string of characters representing a meaning associated with the first string of characters;
   an interpreter for retrieving the second string of characters based upon the first string of characters; and
   an editor, for displaying the second string of characters retrieved by the interpreter.

2. The system claimed in claim 1, wherein the first string of characters defines a type for the protocol header.

3. The system claimed in claim 1, wherein the first string of characters defines a value for the protocol header.

4. The system as claimed in claim 1, wherein the editor enables the user to edit the content of the protocol header.

5. A system for interfacing with a protocol header on a user's computer, the protocol header consisting of a string of characters defining at least a type and a value, the system comprising:
   a) a principal dictionary, having at least one entry, each entry corresponding to a protocol header of a particular type, each entry containing content data indicating an interpretation of at least one type of protocol header;
   b) an interpreter, for associating a specific entry in the principal dictionary with a particular protocol header, and for providing an interpretation of the protocol header according to the content data contained in the entry; and
   c) an editor, for displaying the interpretation provided by the interpreter.

6. A system as claimed in claim 5, wherein the editor also enables the user to alter the value of the protocol header.

7. A system as claimed in claim 6, wherein the interpreter also provides access to any entry in the principal dictionary, and wherein the editor displays each entry provided by the interpreter.

8. A system as claimed in claim 7, wherein the editor also enables the user to fabricate a protocol header expressing a preference of the user, based on an entry, provided by the interpreter, from the principal dictionary.

9. A system as claimed in claim 8, further comprising:
   a) a universal dictionary, containing types of protocol headers not necessarily used by any network content provider and content data indicating interpretations of these types of protocol headers, for selection by a user in conveying preferences to a network content provider;

b) a principal dictionary manager, for updating the principal dictionary so as to include entries from the universal dictionary.

10. A system as claimed in claim 9, further comprising:
a) a site-specific dictionary, containing at least one entry for a type of protocol header, each entry providing content data indicating an interpretation of at least one type of protocol header used by at least one network content provider.

11. A system as claimed in claim 10, wherein, in case of a protocol header of a type not contained in the principal dictionary, the interpreter refers to the site-specific dictionary to interpret the protocol header.

12. A system for managing protocol headers on a user's computer, the user from time to time interfacing with a network content provider server at a network site by using site interfacing software executing on the user's computer and communicating with the network content provider server through a network operating system, the interfacing resulting in the network site setting on the user's computer a protocol header, the protocol header consisting of a string of characters defining at least a type and a value, the system comprising:
a) a principal dictionary, located on the user's computer, having at least one entry, each entry corresponding to a protocol header of a particular type, each entry containing content data indicating an interpretation of at least one type of protocol header;
b) a site-specific dictionary, containing at least one entry, each entry containing an interpretation of at least one type of protocol header used by at least one network content provider;
c) a universal dictionary, containing entries for types of protocol headers not necessarily used by any network content provider and content data indicating interpretations of the types of protocol headers, for selection by a user in conveying preferences to a network content provider;
d) a principal dictionary manager for updating the principal dictionary to include entries from the site-specific dictionary needed to interpret each protocol header on the user's computer that originated at some network content provider network site, and also to include at least one entry from the universal dictionary;
e) an interpreter for examining the protocol headers and for providing an interpretation of each by reference to the principal dictionary, and for providing entries in the principal dictionary; and
f) an editor for displaying interpretations provided by the interpreter and for enabling the user to alter, in case of a protocol header set by a network content provider, the value of the protocol header to any of the values used by the network content provider, and also for enabling the user to fabricate a protocol header expressing a user's preference, the fabricating based on an entry in the universal dictionary.

13. A system for managing cookies on a user's computer, the user from time to time interfacing with an Internet content provider (ICP) website by using a browser executing on the user's computer and communicating with the ICP website through the World Wide Web, the interfacing resulting in the setting of a cookie on the user's computer, a cookie consisting of a string of characters defining a type and a value, the system comprising:
a) a local cookie dictionary, located on the user's computer, having at least one entry, each entry corresponding to a cookie of a particular type, each entry containing content data indicating an interpretation of at least one type of cookie;
b) a site-specific cookie dictionary, containing an interpretation of at least some types of cookies used by at least one ICP website;
c) a universal cookie dictionary, containing types of cookies not necessarily used by any ICP website and interpretations of the types of cookies, for selection by a user in conveying preferences to a website;
d) an interpreter, for associating a specific entry in the local cookie dictionary with a particular cookie, and for providing an interpretation of the cookie according to the content data contained in the entry; and
e) a local cookie dictionary manager for updating the local cookie dictionary to include entries from the site-specific cookie dictionary needed to interpret each cookie, on the user's computer, that originated at some ICP website, and also to include at least some entries from the universal cookie dictionary;
f) a cookie editor for displaying interpretations provided by the cookie interpreter and for enabling the user to alter, in case of a cookie set by an ICP website, the value of the cookie to any of the values used by the ICP website, and also for enabling the user to fabricate a cookie, expressing a preference of the user, based on an entry in the universal cookie dictionary.

14. The system as claimed in claim 13, wherein the cookie interpreter refers to the site-specific cookie dictionary to interpret the cookie.

* * * * *